May 27, 1930.  C. ZIZZO  1,759,878
FOLDING SEAT FOR AUTOMOBILE DOORS
Filed April 30, 1927
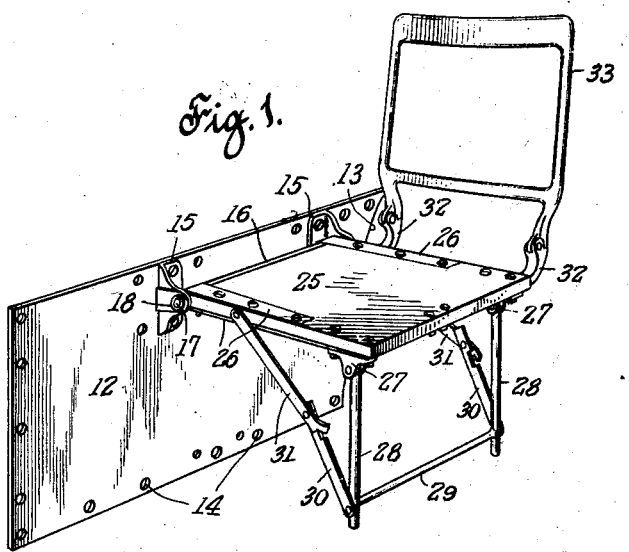
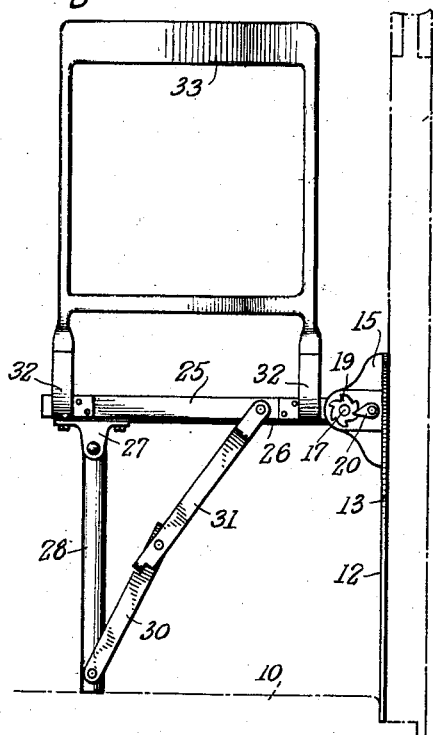
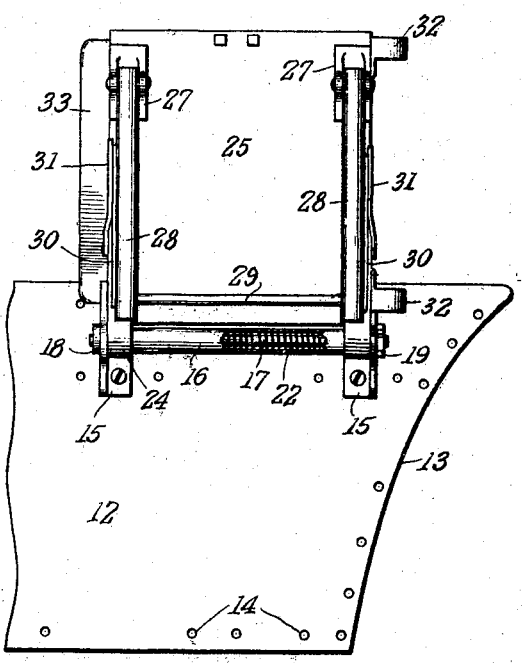
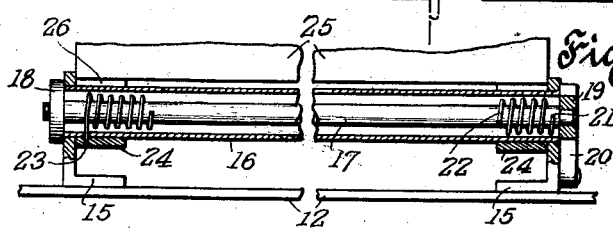
INVENTOR.
Charles Zizzo
BY
ATTORNEYS.

Patented May 27, 1930

1,759,878

UNITED STATES PATENT OFFICE

CHARLES ZIZZO, OF NEWARK, NEW JERSEY

FOLDING SEAT FOR AUTOMOBILE DOORS

Application filed April 30, 1927. Serial No. 187,730.

This invention relates to folding seats and more particularly to such types as are adapted to be supported on the inside of automobile doors.

It often occurs that it is desirable to carry more people than the normal capacity of a vehicle and in so doing everyone is uncomfortable due to squeezing the extra passengers onto the conventional seat.

Travelling in this cramped manner results in annoyance to the occupants and is entirely unsatisfactory.

It is therefore the main object of this invention to increase the capacity of a motor vehicle so that the passengers, in excess of the normal seating capacity of the car, may be carried with comfort and safety.

A further aim is in the provision of a folding seat that is readily brought into use or positioned out of the way when not in use.

A still further characteristic is in the novel means of attaching the seat to the door so that when folded, it presents a neat, flat appearance, not interfering with the usual entrance or exist of passengers to or from the car.

These and other objects, which will become apparent as the description progresses, are accomplished by the novel construction, combination and arrangement of parts, hereinafter described and illustrated in the accompanying drawing, forming an important component of this disclosure, and in which:—

Figure 1 is a perspective view showing the preferred embodiment of the invention, as in an open position for use, the upholstering being omitted.

Figure 2 is a rear elevational view of the same.

Figure 3 is a fragmentary, partial side elevational, partial longitudinal sectional view of the same, as in a folded or closed position.

Figure 4 is a partial longitudinal sectional view of the resilient closing means, drawn to an enlarged scale.

In the drawings, the numeral 10 generally designates the floor of an automobile and the numeral 11, of the hinged rear doors engaging the floor when closed, as shown in Figure 2.

Fixed on the inside, lower portion of the door and flush with its lower and outside, free edges, is a metal plate 12 substantially rectangular in contour having an arcuate rear edge 13 conforming to the usual contour of the door, and a plurality of openings 14 along its edges through which screws pass to engage the door.

Fixed to the plate 12, at the upper edge, are a pair of spaced opposed brackets 15, the same being held by screws suited to engage in any of the several openings in the plate, as seen in Figures 1 and 2, thus providing an adjustment for the seat.

Journalled in the brackets is a sleeve 16 through which passes a rod 17 having a washer 18 at one end and a ratchet wheel 19 at the other end in engagement with a pawl 20 pivoted to the adjacent bracket 15.

Fixed in the rod 17 is one end 21 of a coiled torsion spring 22, its other end 23 passing through the sleeve 16 and anchored in one of a pair of U-shaped brackets 24 fast on the sleeve and engaging a rectangular, wooden seat 25 in its arms 26.

Thus, it will be understood that upon winding the ratchet 19, the seat 25 will tend to rise and fold against the door due to the action of the spring 22.

Secured at the outer, free corners of the seat, are brackets 27 in which are pivoted legs 28 connected by a cross-piece 29, and rotatably mounted on the legs are braces 30 pivoted to mating braces 31 rotatable on the front and rear side edges of the seat.

Extending outwardly and upwardly from the rear edge of the seat are brackets 32 having forks in which is pivoted the lower extremities of a back-rest 33.

Thus, by placing the back 33 on the seat 25 and moving the braces 30—31 upwardly, the legs 28 will fold under the seat and the entire ensemble will assume an upright position as shown in Figure 3.

It will be noted that the device is quickly and easily brought into use or folded to a closed position, and that it occupies very little space when closed presenting an almost flat surface but which enables accommodation of passengers in excess of the normal capacity of the vehicle.

It is to be noted that the seat enables a person to sit facing in either of two directions, in one of which the back 33 may be used as an arm rest, and it is further apparent that the sturdy plate 12 acts to materially re-enforce and strengthen the door to which it is applied.

Although the foregoing is descriptive of the preferred embodiment of the invention, it will be apparent that minor changes may be made in its construction, without the exercise of invention or conflicting with the scope of the claim hereto appended.

Having thus described my invention, what I claim as new and desire to secure by Letters Patent, is:—

In a folding seat, a plate fixed on a support, a sleeve rotatably mounted on said plate, a seat fixed on said sleeve, a rod in said sleeve, a torsional element in said sleeve, one end of said element engaging with said sleeve and the other end with said rod, a ratchet on said rod, and a pawl engaging with said ratchet.

This specification signed and witnessed this 29th day of April, 1927.

CHARLES ZIZZO.